(12) United States Patent
Esaki et al.

(10) Patent No.: US 8,506,013 B2
(45) Date of Patent: Aug. 13, 2013

(54) VEHICLE SEAT

(75) Inventors: Makoto Esaki, Toyota (JP); Akira Konagai, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 547 days.

(21) Appl. No.: 12/709,749

(22) Filed: Feb. 22, 2010

(65) Prior Publication Data

US 2010/0225152 A1 Sep. 9, 2010

(30) Foreign Application Priority Data

Mar. 6, 2009 (JP) .................................. 2009-053452

(51) Int. Cl.
*B60N 2/22* (2006.01)

(52) U.S. Cl.
USPC ................... 297/301.4; 297/354.1; 297/301.3

(58) Field of Classification Search
USPC .................................. 297/301.3, 354.1, 301.4
See application file for complete search history.

(56) References Cited

U.S. PATENT DOCUMENTS

| 4,332,418 A * | 6/1982 | Strowik ......................... 297/362 |
| 4,579,387 A * | 4/1986 | Bell ........................... 297/378.11 |
| 4,874,205 A * | 10/1989 | Arefinejad et al. ....... 297/378.12 |
| 5,547,254 A * | 8/1996 | Hoshihara ................. 297/367 R |
| 5,622,408 A * | 4/1997 | Yamada et al. ............ 297/367 R |
| 7,325,873 B2 * | 2/2008 | Stewart et al. .............. 297/301.3 |
| 2003/0062754 A1 * | 4/2003 | Yamada ....................... 297/354.1 |
| 2009/0102270 A1 | 4/2009 | Wissner et al. |
| 2009/0243359 A1 | 10/2009 | Yoshida et al. |

FOREIGN PATENT DOCUMENTS

| JP | 60-44647 U | 3/1985 |
| JP | 2000-215560 | 9/2000 |
| JP | 2001-292850 | 10/2001 |
| JP | 2004-105543 | 4/2004 |
| JP | 2004-305549 | 11/2004 |
| JP | 2008-272284 | 11/2008 |

OTHER PUBLICATIONS

Japan Office action, dated Apr. 23, 2013 along with an english translation thereof.

* cited by examiner

*Primary Examiner* — Sarah B McPartlin
(74) *Attorney, Agent, or Firm* — Greenblum & Bernstein, P.L.C.

(57) ABSTRACT

In a vehicle seat that includes a seat cushion, a seatback that is rotatably attached to the seat cushion, and a spring that urges the seatback to a raised upright position from a reclined position in which the seatback is tilted back behind the seat cushion, the spring is spiral shaped, with a center-side end portion that is arranged near the rotational center of the seatback hooked on a seatback-connected member and an outside end portion that is positioned on the outer peripheral side of the spring hooked on a seat cushion-connected member. A shield member that covers the spring is attached to the seat cushion.

1 Claim, 6 Drawing Sheets

VEHICLE SEAT

INCORPORATION BY REFERENCE

The disclosure of Japanese Patent Application No. 2009-053452 filed on Mar. 6, 2009 including the specification, drawings and abstract is incorporated herein by reference in its entirety.

BACKGROUND OF THE INVENTION

1. Field of the Invention

The invention relates to a vehicle seat mounted in a vehicle such as an automobile.

2. Description of the Related Art

Japanese Patent Application Publication No. 2004-305549 (JP-A-2004-305549) describes a vehicle seat having, for example, a seat cushion, a seatback that is rotatably attached to the seat cushion, and a spring that urges the seatback to a raised upright position from a reclined position in which it is tilted back behind the seat cushion. The spring is spiral shaped and has a center-side end portion arranged near the rotational center of the seatback, and an outside end portion positioned on the outer peripheral side of the spring. The center-side end portion is hooked on a seat cushion-side hook, and the outside end portion is hooked on a seatback-side hook. Therefore both the outside end portion of the spring and the seatback-side hook move with respect to the seat cushion when the seatback rotates with respect to the seat cushion.

However, a shield member that covers the spring is typically attached to the side of the seat cushion. It is desirable to make this shield member small so that it does not get in the way when a user gets in and out of the vehicle. One way to make the shield member small is to make the spring small. The problem with this approach, however, is that the spring must be able to apply a predetermined amount of torque to the seatback, which makes it difficult to reduce the size of the spring.

SUMMARY OF THE INVENTION

Thus, the invention provides a vehicle seat that enables a shield member that covers a spring to be made small.

A first aspect of the invention relates to a vehicle seat. This vehicle seat has a spring that is spiral shaped, with a center-side end portion that is arranged near the rotational center of the seatback hooked on a seatback-connected member (i.e., a member that is connected to the seatback) and an outside end portion that is positioned on the outer peripheral side of the spring hooked on a seat cushion-connected member (i.e., a member that is connected to the seat cushion). A shield member that covers the spring is attached to the seat cushion.

Accordingly, when the seatback is rotated with respect to the seat cushion, the center-side end portion of the spring moves together with the seatback, but the outside end portion of the spring does not move with respect to the seat cushion. Thus, the shield member can be made small. For example, in a related shield member, the outside end portion of the spring moves together with the seatback, so space is needed to cover the path along which the outside end portion moves. In contrast, with the aspect described above, that space is not needed for the shield member because the outside end portion of the spring does not move, which means that the shield member can be made smaller. Also, with the related shield member, there must be a sufficient gap between it and the spring so that the outside end portion of the spring, which moves, will not hit the shield member. In contrast, with the aspect described above, this gap can be made smaller because the outside end portion of the spring does not move. Thus, the shield member is able to be made smaller.

In the aspect described above, the outside end portion of the spring and a hook of the seat cushion-connected member on which the outside end portion is hooked may be positioned below the rotational center of the seatback with respect to the seat cushion.

Therefore, because the outside end portion of the spring is positioned below the rotational center of the seatback, the upper part of the shield member can be made smaller. There may be cases in which the upper part of the shield member protrudes above the seat cushion and, as a result, gets in the way when a user gets in and out of the vehicle. However, this aspect enables this part of the shield member to be made smaller, so there is little likelihood that it will get in the way. Also, the hook is positioned below the rotational center of the seatback, so it can easily be positioned on the seat cushion main body side and provided on a member on the seat cushion side. Therefore, the member on the seat cushion side on which the hook is provided can also be made small.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
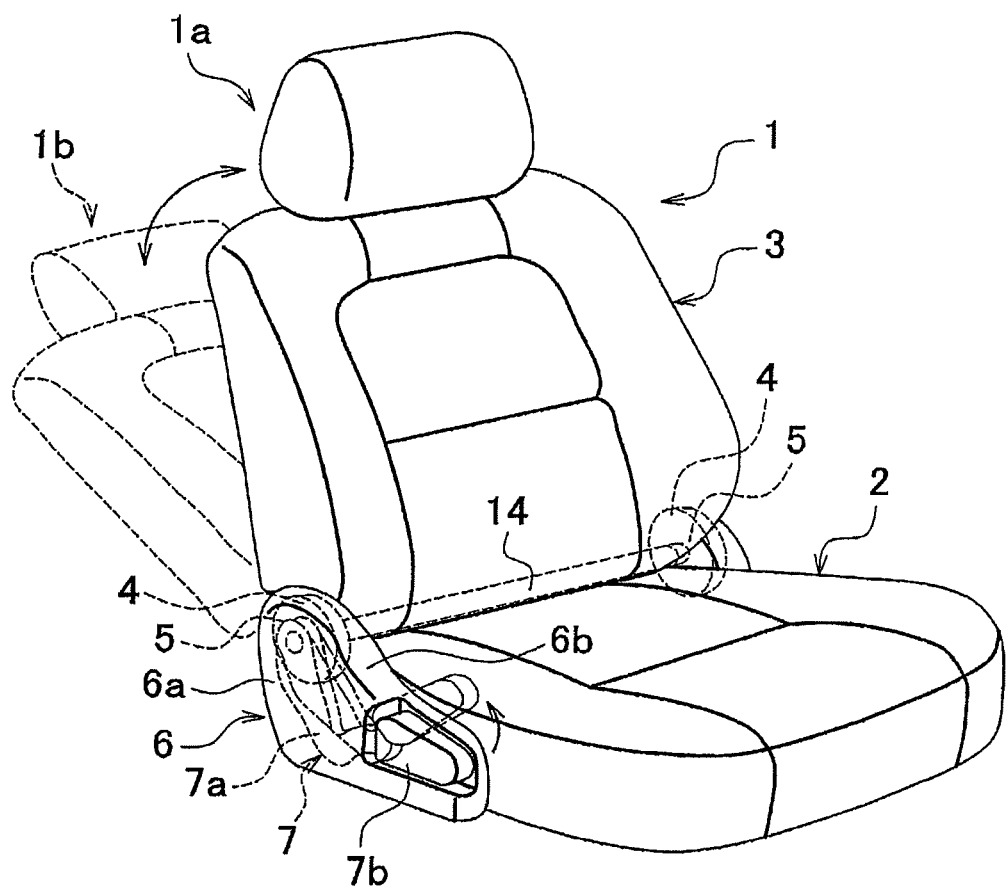
FIG. 1 is a perspective view of a vehicle seat.

A first example embodiment of the invention will be described in greater detail below with reference to FIGS. 1 to 4. The vehicle seat 1 is a seat that may be mounted in a vehicle such as an automobile, and includes a seat cushion 2 and a seatback 3, as shown in FIG. 1. The seat cushion 2 is fixed to the floor of the vehicle or slidably mounted via a sliding device to the floor of the vehicle. The seatback 3 is rotatably mounted to the rear portion of the seat cushion 2. A reclining device 4 and a spring 5 are provided between the seat cushion 2 and the seatback 3.

Figure 3:
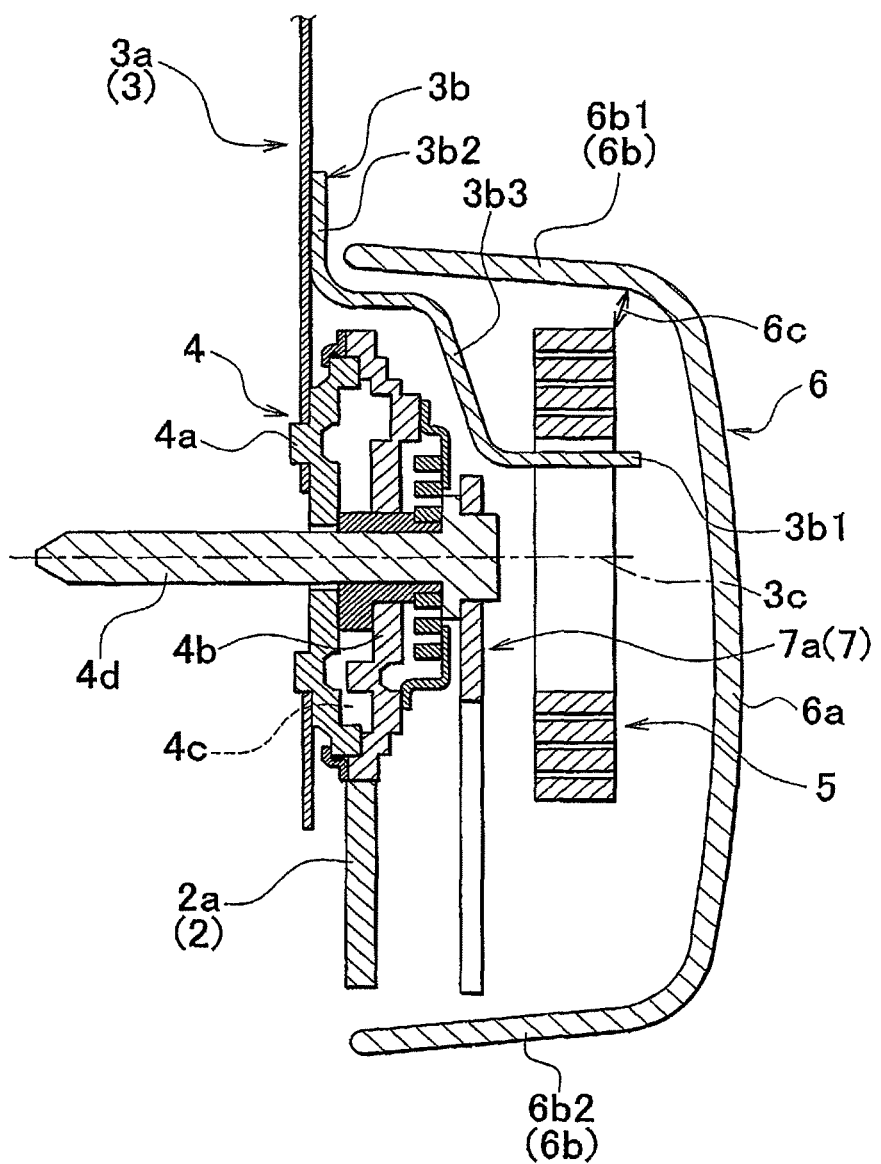
FIG. 3 is a sectional view taken along line III-III in FIG. 2.

The reclining device 4 connects the seatback 3 to the seat cushion 2 in such as manner that enables the angle between the seatback 3 and the seat cushion 2 to be adjusted, as shown in FIG. 1. This reclining device 4 has a first connecting member 4a and a second connecting member 4b, both of which are disc shaped and overlap each other so as to be able to rotate relative one another, as shown in FIG. 3. A locking mechanism 4c that locks these first and second connecting members 4a and 4b together so that they are unable to rotate relative one another is provided between the first and second connecting members 4a and 4b. This locking mechanism 4c is released by the axial rotation of a release member 4d. A release lever 7 is attached to the end portion of the release member 4d.

Figure 2:
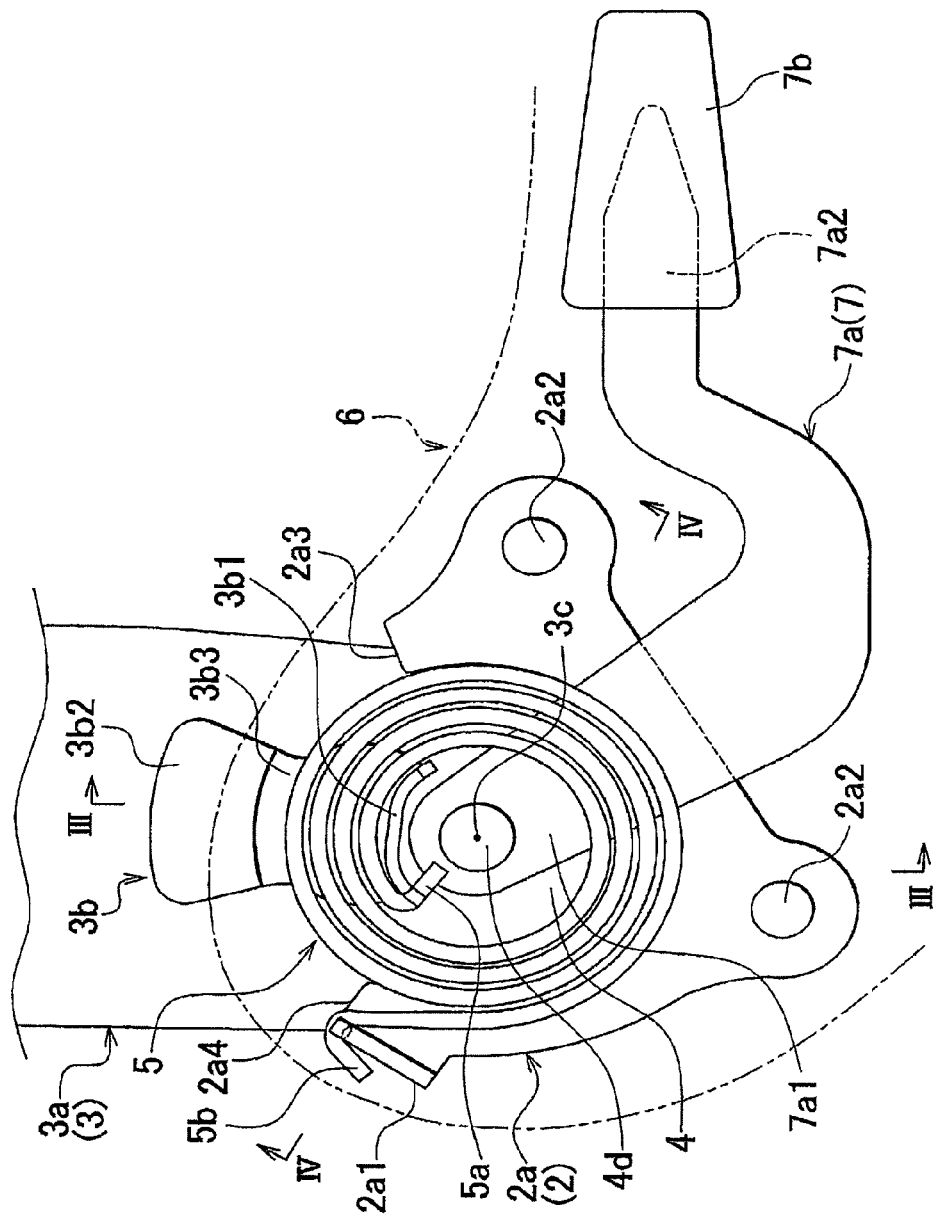
FIG. 2 is a side view of part of the vehicle seat near a spring according to a first example embodiment of the invention.

The release lever 7 has an arm 7a and a handle 7b, as shown in FIGS. 1 and 2. A rear end portion 7a1 of the arm 7a is attached to the release member 4d of the reclining device 4. The handle 7b is fitted onto a front end portion 7a2 of the arm 7a. This handle 7b is operated by a user. As shown in FIG. 3, the first connecting member 4a is attached to a bracket 3a, and the second connecting member 4b is attached to a bracket 2a. The bracket 3a is attached to the frame of the seatback 3, and the bracket 2a is attached to the frame of the seat cushion 2.

The spring 5 is provided between the seat cushion 2 and the seatback 3 to urge the seatback 3 from a reclined position 1b to an upright position 1a, as shown in FIGS. 1 and 2. The spring 5 is spiral shaped or helical shaped with a generally square cross-section along its entire length. The winding distance of the spring 5, i.e., the gap in the radial direction between the adjacent windings of the spring 5, is the same along substantially the entire circumference when the spring 5 is in a free state, i.e., when no pressure is being applied to the spring 5.

The spring 5 has a center-side end portion 5a and an outside end portion 5b, as shown in FIG. 2. The center-side end portion 5a is positioned on the center-side of the spring 5 and is folded back and extends toward the center from an arced portion. The outside end portion 5b is positioned on the outer peripheral side of the spring 5 and is folded back and extends radially outward from an arced portion. The center-side end portion 5a is hooked on a hook 3b1 of a hook member 3b which is a member that is connected to the seatback 3. The outside end portion 5b is hooked on a hook 2a1 of the bracket 2a which is a member that is connected to the seat cushion 2.

As shown in FIGS. 2 and 3, the hook member 3b has a fixed portion 3b2 that is fixed to the bracket 3a, and an extended portion 3b3 that extends from the fixed portion 3b2. The extended portion 3b3 extends nearly parallel to the reclining device 4 toward the rotational center 3c of the seatback 3 from above the reclining device 4. A hook 3b1 that extends out toward the spring 5 is provided on the end portion of the extended portion 3b3. The hook 3b1 is positioned near the rotational center 3c, at a location a predetermined distance above the rotational center 3c. The hook 3b1 extends out in a general arc shape and the spring 5 is arranged on the outer peripheral surface side of the hook 3b1, with the center-side end portion 5a hooked on one end edge of the hook 3b1.

Figure 4:
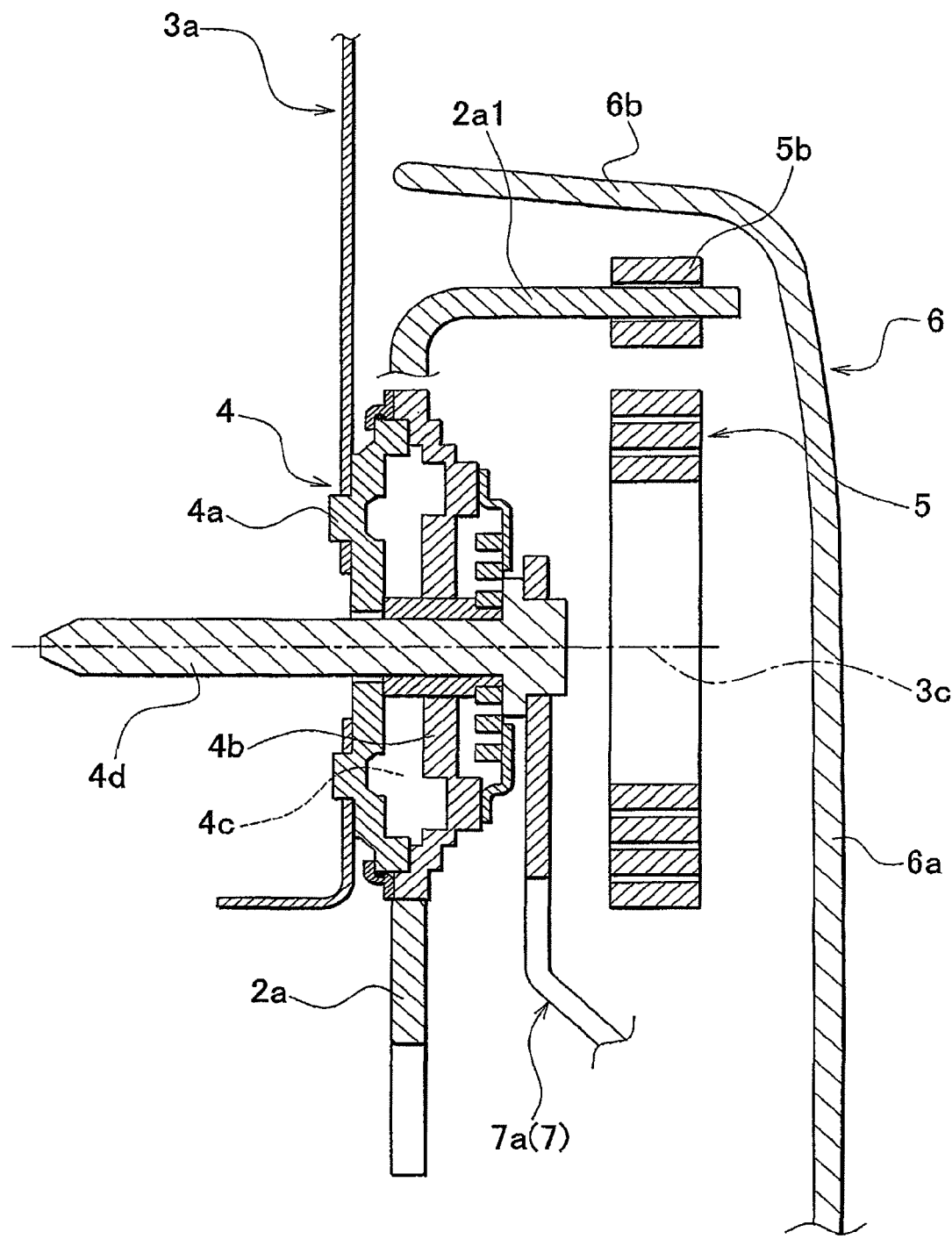
FIG. 4 is a sectional view taken along line IV-IV in FIG. 2.

The bracket 2a extends along an outer peripheral lower portion of the reclining device 4, as shown in FIGS. 2 and 4. A pair of mounting portions 2a2 are provided on the lower portion of the bracket 2a. These mounting portions 2a2 are mounted to the frame of the seat cushion 2 with bolts. A hook 2a1 that extends out toward the spring 5 from the main body of the bracket 2a is provided on the rear upper portion of the bracket 2a. The spring 5 is arranged on the front side of the hook 2a1, with the outside end portion 5b of the spring 5 hooked-on the upper end edge of the hook 2a1.

The bracket 2a has a front stopper portion 2a3 on the front upper end edge and a rear stopper portion 2a4 on the rear upper end edge, as shown in FIG. 2. The amount of movement of the extended portion 3b3 of the hook member 3b that is positioned between the stopper portions 2a3 and 2a4 is restricted by these stopper portions 2a3 and 2a4. Therefore, the rotational angle of the seatback 3 with respect to the seat cushion 2 is restricted by the extended portion 3b3 and the stopper portions 2a3 and 2a4.

As shown in FIGS. 1 and 3, a shield member 6 for covering up the reclining device 4 and the spring 5 is attached to the seat cushion 2. The shield member 6 is made of resin and has a shield main body 6a that is connected to the side of the seat cushion 2, and an outer peripheral edge portion 6b formed on the outer peripheral edge of the shield main body 6a. The outer peripheral edge portion 6b extends from the shield main body 6a toward the seat cushion 2 so as to cover the outer periphery of the spring 5. The outer peripheral portion 6b has an upper outer peripheral edge portion 6b1 that covers the spring 5 from above and a lower outer peripheral edge portion 6b2 that covers the spring 5 from below.

As shown in FIG. 1, the reclining device 4 unlocks when the release lever 7 is moved upward when the seatback 3 is in the upright position 1a. When the reclining device 4 is unlocked, the seatback 3 is freed so that it is able to rotate with respect to the seat cushion 2. Reclining the seatback 3 to the reclined position 1b when it is freed moves the hook 3b1 that is connected to the seatback 3. As the hook 3b1 moves, it pulls the center-side end portion 5a of the spring 5 counterclockwise in FIG. 2.

As a result, the spring 5 elastically deforms in the winding direction and urges the seatback 3 toward the upright position 1a from the reclined position 1b, as shown in FIG. 1. Therefore, when the seatback 3 is freed while in the reclined position 1b, the urging force of the spring 5 moves, or helps to move, the seatback 3 to the upright position 1a.

As described above, the spring 5 is spiral shaped, with the center-side end portion 5a that is arranged near the rotational center 3c of the seatback 3 hooked on a member (i.e., the hook member 3b) that is connected to the seatback 3, and the outside end portion 5b that is positioned on the outer peripheral side of the spring 5 hooked on a member (i.e., the bracket 2a) that is connected to the seat cushion 2, as shown in FIGS. 2 and 3. Also, the shield member 6 that covers the spring 5 is attached to the seat cushion 2.

Therefore, when the seatback 3 is rotated with respect to the seat cushion 2, the center-side end portion 5a of the spring 5 moves together with the seatback 3, but the outside end portion 5b of the spring 5 does not move with respect to the seat cushion 2. Thus, the shield member 6 can be made small. For example, in a related shield member, the outside end portion of the spring moves together with the seatback, so space is needed to cover the path along which the outside end portion moves. In contrast, with this example embodiment, that space is not needed because the outside end portion 5b of the spring 5 does not move, which means that the shield member 6 can be made smaller. Also, with the related shield member, there must be a sufficient gap between it and the spring so that the outside end portion of the spring, which moves, will not hit the shield member. In contrast, with this example embodiment, this gap (more specifically, the gap 6c between the upper outer peripheral edge portion 6b1 and the spring 5 shown in FIG. 3) can be made smaller because the outside end portion 5b of the spring 5 does not move. Thus, the shield member 6 is able to be made smaller.

Next, a second example embodiment of the invention will be described with reference to FIGS. 5 and 6. This second example embodiment is substantially similar to the first example embodiment, except in that a hook 2a5 and a release lever 8 shown in FIG. 5 are provided instead of the hook 2a1 and the release lever 7 shown in FIG. 2.

Figure 5:
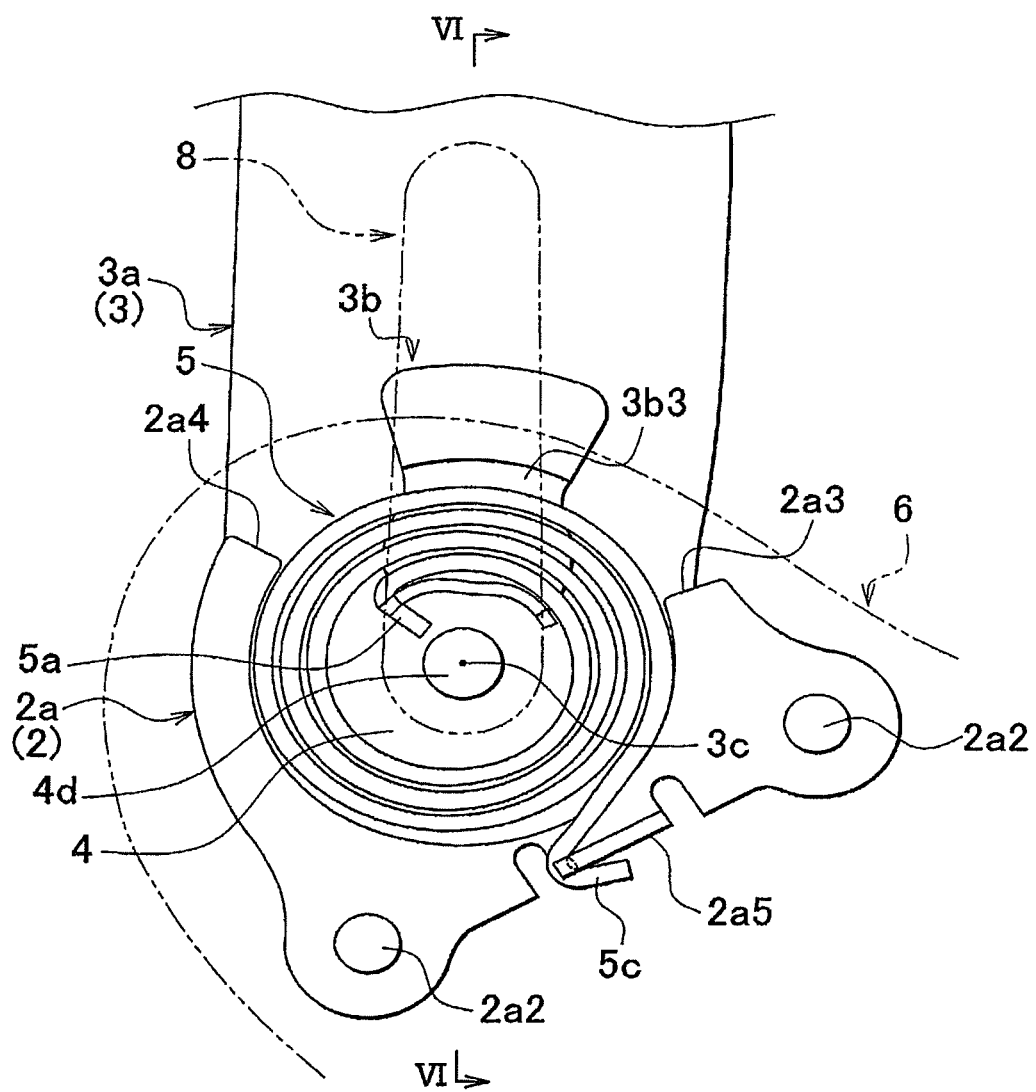
FIG. 5 is a side view of part of the vehicle seat near the spring according to a second example embodiment of the invention.

The hook 2a5 shown in FIG. 5 is provided on the lower portion of the bracket 2a, in a position between the pair of mounting portions 2a2. The hook 2a5 is positioned below and in front of the rotational center 3c of the seatback 3. An outside end portion 5c that is hooks on the hook 2a5 is formed on the spring 5. The outside end portion 5c is positioned on the outer peripheral side of the spring 5 and is folded back and extends radially outward from an arced portion.

Figure 6:
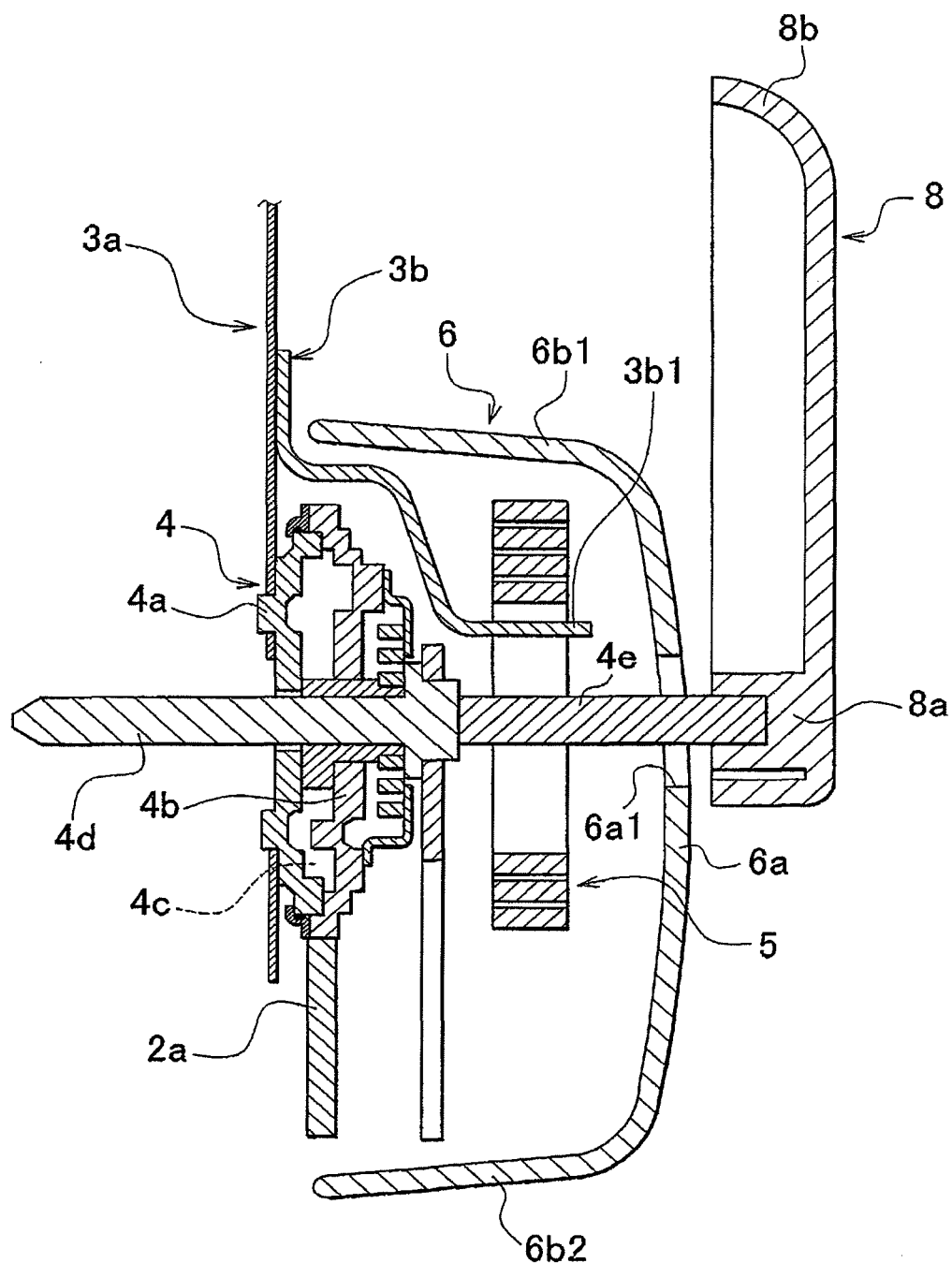
FIG. 6 is a sectional view taken along line VI-VI in FIG. 5.

As shown in FIGS. 5 and 6, the release lever 8 has a mounting portion 8a that is mounted to an extended portion 4e of the reclining device 4, and an operating portion 8b that extends upward from the mounting portion 8a. The extended portion 4*e* extends from the release member 4*d* through a through-hole 6*a*1 in the shield main body 6*a*. The mounting portion 8*a* is fixed to the tip end portion of this extended portion 4*e*. Accordingly, the reclining device 4 can be unlocked by operating the operating portion 8*b*.

In this way, the outside end portion 5*c* of the spring 5 and the hook 2*a*5 that is connected to the seat cushion 2 and on which the outside end portion 5*c* of the spring 5 is hooked is positioned below the rotational center 3*c* of the seatback 3 with respect to the seat cushion 2. Therefore, because the outside end portion 5*c* of the spring 5 is positioned below the rotational center 3*c* of the seatback 3, the upper part of the shield member 6 can be made smaller. There may be cases in which the upper part of the shield member 6 protrudes above the seat cushion 2 and, as a result, gets in the way when a user gets in and out of the vehicle, but this example embodiment enables this part of the shield member 6 to be small, so there is little likelihood that it will get in the way. Also, the hook 2*a*5 is positioned below the rotational center 3*c* of the seatback 3, so it can easily be positioned on the seat cushion main body side and provided on a member (i.e., the bracket 2*a*) that is connected to the seat cushion 2. Therefore, the member on which the hook 2*a*5, that is connected to the seat cushion 2, is provided can also be made small.

The invention is not limited to the first and second example embodiments described above. Other modes, such as those described below, are also possible.
(1) The shield member 6 described in the first and second example embodiments is shaped so that it covers the rear portion of the side of the seat cushion 2, as shown in FIG. 1. Alternatively, however, a shield member may be shaped so that it covers substantially the entire side of the seat cushion.
(2) The hook 2*a*1 and 2*a*5 that is connected to the seat cushion 2 described in the first and second example embodiments is provided on the bracket 2*a*. Alternatively, however, a hook may be provided on another member that is connected to the seat cushion, such as the frame.
(3) The hook 3*b*1 that is connected to the seatback 3 described in the first and second example embodiments is provided on the hook member 3*b*. Alternatively, however, a hook may be provided on another member that is connected to the seatback, such as the bracket 3*a* or the frame of the seatback.
(4) The seat 1 described in the first and second example embodiments is mounted in a vehicle, but it may also be mounted in a marine vessel or an aircraft or the like.

What is claimed is:
1. A vehicle seat comprising:
a seat cushion;
a seatback that is rotatably attached to the seat cushion;
a bracket, including a front stopper portion and a rear stopper portion, that is connected to the seat cushion;
a hook member that is connected to the seatback, positioned between the front stopper portion and the rear stopper portion of the bracket, and movable between the front stopper portion and the rear stopper portion;
a spring that urges the seatback to a raised upright position from a reclined position in which the seatback is tilted back behind the seat cushion; and
a shield member that covers the spring and is attached to the seat cushion, wherein
the spring is spiral shaped with a center-side end portion that is arranged near a rotational center axis of the seatback and hooked on a hook of the hook member that is positioned above the rotational center axis of the seatback, and an outside end portion that is positioned on an outer peripheral side of the spring and hooked on a hook positioned proximate the rear stopper portion of the bracket.

* * * * *